United States Patent [19]

Rodi et al.

[11] Patent Number: 4,965,497
[45] Date of Patent: Oct. 23, 1990

[54] CONTROL CIRCUIT FOR AN ELECTRIC DRIVE MOTOR

[75] Inventors: Anton Rodi, Leimen; Michael Krüger, Edingen-Neckarhausen, both of Fed. Rep. of Germany

[73] Assignee: Heidelberger Druckmaschinen AG, Heidelberg, Fed. Rep. of Germany

[21] Appl. No.: 188,652

[22] Filed: Apr. 29, 1988

Related U.S. Application Data

[63] Continuation of Ser. No. 934,308, Nov. 24, 1986, abandoned.

[30] Foreign Application Priority Data

Nov. 22, 1985 [DE] Fed. Rep. of Germany ....... 3541275

[51] Int. Cl.$^5$ .............................. H02B 1/20
[52] U.S. Cl. .................... 318/372; 318/280; 361/355
[58] Field of Search ........... 318/256, 261, 280, 345 C, 318/345 G, 370, 371, 372; 361/355; 363/54, 69, 141

[56] References Cited

U.S. PATENT DOCUMENTS

| | | | |
|---|---|---|---|
| 3,535,610 | 10/1970 | Maynard | 318/345 G |
| 3,551,782 | 12/1970 | Maynard | 363/54 |
| 3,721,890 | 3/1973 | Ettinger et al. | 363/144 |
| 3,725,758 | 4/1973 | Loyk | |
| 3,821,628 | 6/1974 | Caputo | 318/345 C |
| 3,895,285 | 7/1975 | Bardahl et al. | 363/141 |
| 4,056,767 | 11/1977 | Tobise et al. | 363/141 |
| 4,145,640 | 3/1979 | Kipp et al. | 318/345 G |
| 4,161,016 | 7/1979 | Born et al. | 363/141 X |
| 4,414,619 | 11/1983 | Kahkipuro | 363/70 |
| 4,471,855 | 9/1984 | Nomura | 363/69 X |

FOREIGN PATENT DOCUMENTS

| | | | |
|---|---|---|---|
| 0066801 | 12/1982 | European Pat. Off. | 363/141 |
| 54-16616 | 2/1979 | Japan | 318/345 C |
| 54-111631 | 9/1979 | Japan | 363/70 |
| 1112456 | 5/1968 | United Kingdom | 361/355 |
| 1172415 | 11/1969 | United Kingdom | |

Primary Examiner—Bentsu Ro
Attorney, Agent, or Firm—Herbert L. Lerner; Laurence A. Greenberg

[57] ABSTRACT

A control circuit for an electric motor having a power control element containing a first semiconductor for driving the motor in one torque direction, and a power control element containing a second semiconductor for driving the motor in the other torque direction includes a circuit-breaker for at least isolating one of the power control elements, upon failure of the one power control element, and connecting the remainder of the circuit to the other power control element instead of the failed power control element.

10 Claims, 2 Drawing Sheets

CONTROL CIRCUIT FOR AN ELECTRIC DRIVE MOTOR

This application is a continuation, of application Ser. No. 934,308, filed Nov. 24, 1986, now abandoned.

BACKGROUND OF THE INVENTION

The invention relates to a control circuit for an electric drive motor, for example, for a printing press or the like, having a power control element containing semiconductors for driving the motor in one torque direction, and a power control element containing semiconductors for driving the motor in the other torque direction.

DESCRIPTION OF THE RELATED ART

Such control circuits are known. Driving of the motor in the one torque direction is understood to mean that the motor either runs in this direction and yields mechanical power thereby, or that the motor runs in the other direction and is electrically braked by a torque electrically generated and acting in the first torque direction. The same applies analogously for the other torque direction. Conventional control circuits permit electrical braking of the drive motor and therefore the entire printing press or other machine at least in those cases wherein the motor is running in the first direction stated, which is hereinafter designated in the interest of simplicity as the forward direction or forward run.

Electrical braking of a motor can be performed in various ways, for example by resistance braking or regenerative braking. In order to avoid the inconvenience which occurs, for example, as a result of the great space requirements of brake resistances and/or due to heat production in these resistances during braking, regenerative braking wherein the motor yields electrical energy to the mains system during braking is frequently preferred. The invention, too, prefers regenerative braking; however, the invention is not limited to regenerative braking.

In the present state of the art, DC motors fed from an AC mains supply (which is also intended to include a supply system providing multi-phase AC current) are generally used as drive motors for high-quality printing presses, in particular offset printing presses. Such an arrangement is also used for the embodiment described herein.

If the power control element supplying the armature current should fail during forward running of the motor due to damage to one of the semiconductors, which cannot be completely excluded even when high-quality semiconductors are used, the printing press or other machine driven by the drive motor cannot be used where conventional control circuitry is used until the damage has been rectified. Reverse running of the drive motor for a printing press is generally only used for setting operations, in conjunction, for example, with the changing of a printing plate. If the power control element used for reverse running fails due to failure of a semiconductor, forward running normally also becomes impossible. Nor is electrical braking possible in this case. Naturally, such a machine will slow down to standstill even without electrical braking, due to the braking moment executed by the printing press after the energy supply to the motor has been switched off.

SUMMARY OF THE INVENTION

It is accordingly an object of the invention to provide a control circuit for an electric drive motor which reduces the shutdown times occurring upon failure of a semiconductor.

With the foregoing and other objects in view, there is provided, in accordance with the invention, a control circuit for an electric motor having a power control element containing a first semiconductor for driving the motor in one torque direction, and a power control element containing a second semiconductor for driving the motor in the other torque direction, comprising a circuit breaker for at least isolating one of the power control elements, upon failure of the one power control element, and connecting the remainder of the circuit to the other power control element instead of the failed power control element.

The just-mentioned power control element for driving the motor in the one torque direction is to be referred to hereinafter, in the interest of simplicity, as the power control element responsible for forward running of the motor. Should this control element fail, which would require repair for conventional circuitry before operation of the machine could be resumed, the invention provides for the failed control element to be electrically isolated and for the other power control element to be switched over in its place, the other power control element now assuming responsibility for forward running of the machine. However, it is now no longer possible to brake the motor or machine electrically, but the machine will, however, coast down to standstill, as mentioned hereinbefore, even without electrical braking, once the energy supply has been switched off.

The circuit-breaker can most simply be realized by connecting the control connections and the load connections (heavy-current connections) of the two power control elements to the rest of the control circuit, to the mains and to the electrical lines leading to the electric motor by means of flexible cabling of adequate length, or by means of rigid busbars and screw terminal connections. In case of failure of the power control element for forward running, all connections to and from the two power control elements are interrupted and the functioning power control element can be electrically connected in place of the defective power control element.

Machine downtime can therefore be kept relatively brief only with the use of screw terminal connections, i.e. without the use of rapidly manually actuated electrical switches or even automatic switches; it would, for example, be only a few minutes in such a case. After switchover, the defective power control element can either be removed and repaired on the spot, or it can be returned to the manufacturing company for repair purposes, or a replacement can be ordered. In view of the high degree of reliability possessed by semiconductor elements, there is a great probability of being able to maintain the just-described emergency mode of operation until repair is possible.

If the power control element required for electrical braking and for reverse running fails in the control circuit for a printing press, only this power control element will be electrically isolated.

Isolation of at least the heavy-current lines is expedient, because a lasting short circuit must be anticipated in case of failure of a semiconductor.

In order to ensure that one power control element can without difficulty be used in place of the other, it is advantageous if, in accordance with another feature of the invention, both control elements are of substantially identical construction.

It is also advantageous if, in accordance with a further feature of the invention, each power control element is constructed as a unit which can be readily removed from the control circuit. The defective power control element can then be removed from the control circuit, and the control circuit can continue to function using the sole power control element which remains functioning, after performance of the switching operations described hereinbefore. The power control element removed from the control circuit can then be repaired on the spot without any urgency, or returned to the manufacturer for repair purposes.

As mentioned hereinbefore, the power control elements, in accordance with an added feature of the invention, are controllable current converters and, in accordance with an additional feature of the invention, each power control element contains an AC bridge circuit, in particular a bridge circuit for three-phase alternating current.

The changeover to emergency operation in the case of failure of one of the power control elements can be performed particularly quickly if, in accordance with yet another feature of the invention, switches are provided to facilitate changeover between the two power control elements. In a simple case, such switches can be actuated by hand, in order that the printing press or other machine driven by the drive motor can be in operational condition again within a few seconds after detection of the failure of one of the power control elements. However, it is also possible to install controllable switches which are actuated automatically in case of failure of one of the power control elements, with the result that absolutely no downtime occurs at all.

The manner in which failure of one of the power control elements is detected and/or indicated and/or in which the just-mentioned automatic switches are actuated in such a case is not the subject of the invention of the instant application.

In accordance with yet a further feature of the invention, an auxiliary braking facility is provided for braking the motor in case of failure of a respective power control element. This has the advantage that the motor and the printing press coupled to it can be brought rapidly to a standstill in case of failure of the respective power control element.

Such additional braking facility can be realized in various ways. One construction of the invention provides for an auxiliary or additional brake, the control mechanism being capable of switchover in such a way that it generates a control signal for actuation of the brake at least in case of failure of the respective power control element in the case wherein a condition necessitating electrical braking of the motor occurs.

The control circuitry is then switched in such a way that actuation or enabling signals are then generated for the additionally installed brake instead of actuation or enabling signals for the power control element originally installed for electrical braking, and are passed to such additionally installed brake, where necessary after appropriate amplification, for example by means of a relay or magnetic switch. In this construction, if the power control element for the other torque direction, which is normally required for electrical braking, should fail, only this, power control element is electrically isolated, and the control circuit is switched, as described hereinafore, in order that the additionally installed brake can be used as an operating brake.

In this regard, upon failure of the respective power control element, the additional or auxiliary brake, which is then applied as an operating brake until repair has been completed, is used for braking the motor. On the other hand, provided the control circuit is in trouble-free condition, the brake additionally installed will not be required for braking, and is thus relieved of premature wear. In such a case, the additional or auxiliary brake serves as a safety mechanism, for example in order to block the printing press during maintenance work so that it cannot be set in motion even if the drive motor should be switched on. The additional or auxiliary brake can also be used as a safety mechanism in case of power failure in the electrical supply to the motor. In such cases, the brake can, for example, be applied by means of a spring mechanism, whereas it is kept in cleared or disengaged position when mains voltage is present. The additional or auxiliary brake may be, for example, an electromechanical brake, or a hydraulically or pneumatically operated brake: it must, however, be capable of being electrically operated in some way.

The switchover sequence described hereinbefore, which actuates the additional or auxiliary brake instead of an electrical braking operation, can be applied analogously in other constructions of the invention wherein the additional or auxiliary braking facility is afforded due to the fact that motor excitation can be reversed, or due to the fact that, in another construction of the invention, the direction of armature current can be reversed.

Other features which are considered as characteristic for the invention are set forth in the appended claims.

Although the invention is illustrated and described herein as embodied in a control circuit for an electric drive motor, it is nevertheless not intended to be limited to the details shown, since various modifications and structural changes may be made therein without departing from the spirit of the invention and within the scope and range of equivalents of the claims.

BRIEF DESCRIPTION OF THE DRAWING

The construction and method of operation of the invention, however, together with additional objects and advantages thereof will be best understood from the following description of specific embodiments when read in connection with the accompanying drawings, in which.

DESCRIPTION OF THE PREFERRED EMBODIMENT

Figure 1:
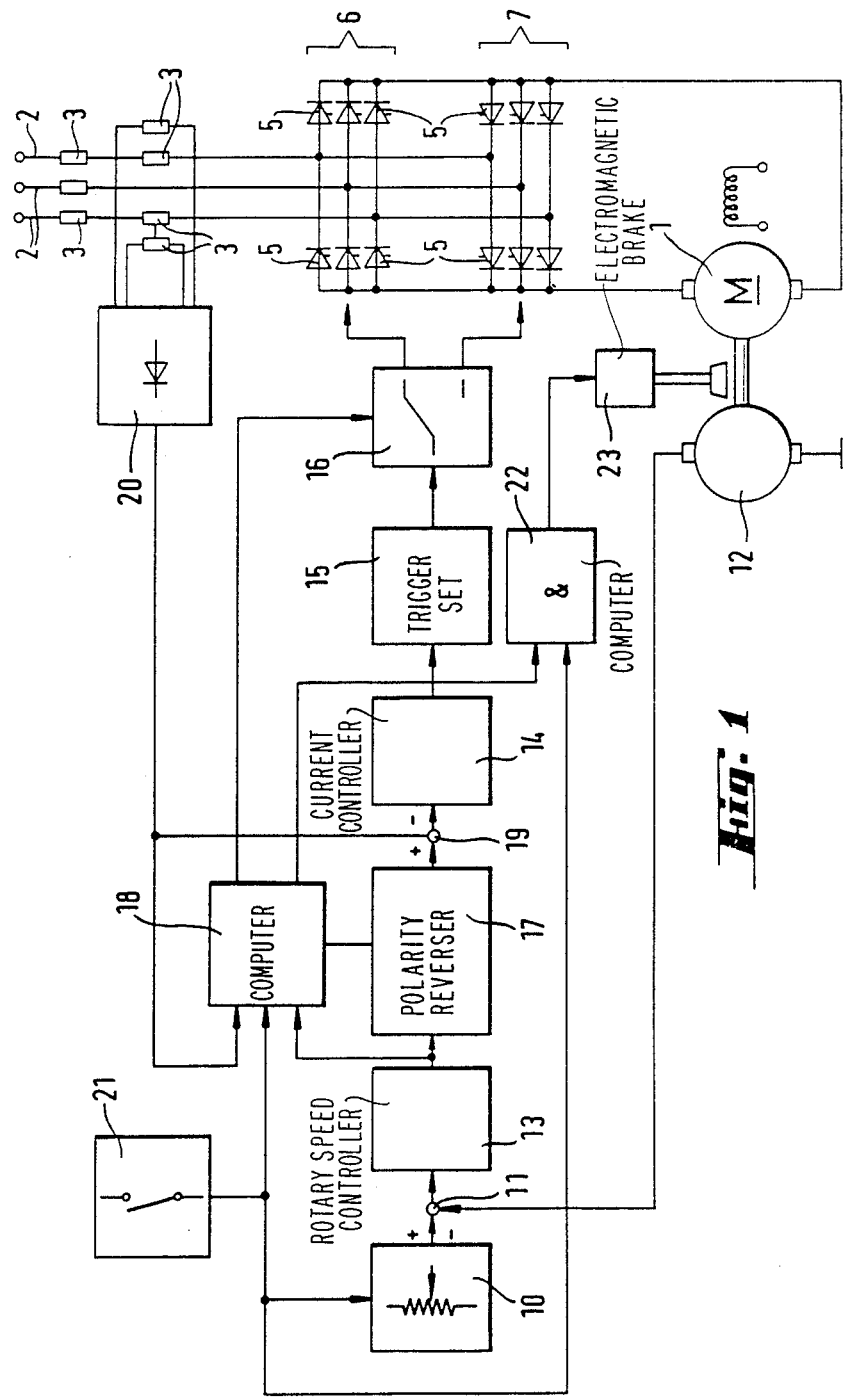
FIG. 1 is a block circuit diagram of a main drive for a printing one embodiment of a control circuit according to the invention.

Referring now to the drawing and, first, to FIG. 1 thereof, there is shown a diagram of the control circuit required for operation of a motor 1, namely a shunt-wound DC motor. This circuit is connected via three poles by means of connecting lines 2 to a three-phase supply network. Current converters 3 are installed in two of the connecting lines 2. The connecting lines 2 lead to a first bridge circuit 6 formed with six thyristors 5, and to a second bridge circuit 7, which is installed antiparallel to the bridge circuit 6, and which is identical to the bridge circuit 6. The bridge circuit 6 is used to generate direct current from the three-phase alternative current supply, the direct current being fed to the motor 1 during forward running, and the bridge circuit 7 being used for feeding the motor during reverse running, or for return of electrical energy from the motor 1 to the AC mains supply during forward running of the motor in an electrical braking operation. The control lines leading to the thyristors are not shown, in the interest of keeping the drawing as simple as possible.

As long as both of the bridge circuits 6 and 7 remain in functioning condition, the sense of rotation and the setpoint or nominal speed of the motor 1, which is used for driving an offset printing press, are prescribed by the setting of a potentiometer 10, the pick-up from which is routed to an input of a subtraction circuit 11, which has another input to which the output signal from a rotary speed transmitter, in the form of a tachogenerator 12 in the illustrated embodiment is fed, the tachogenerator 12 being linked to the motor and supplying a voltage proportional to the rotary speed. The output signal from the subtraction circuit 11 is routed to the input of a rotary speed controller 13 which actuates a current controller 14 dependent upon whether there is a deviation in the speed of the motor 1 from the sense of rotation and the speed determined by the voltage prescribed by the potentiometer 10, and whether the motor speed is greater or less than the setpoint or nominal speed. The current controller 14 actuates a control or trigger set 15, which generates correctly phased ignition pulses for the thyristors of one of the bridge circuits 6 and 7, in order that the amounts of the actual value of the current taken from the current measuring equipment 20, 3 and the setpoint or nominal value of the current at the output from the speed controller 13 are of identical magnitude at a comparator 19. Only one of the bridge circuits 6 and 7 are in operation at any one time, and a current reversal logic or current reversal computer unit 18 ensures, with the assistance of a pulse reverser 16, that the pulses generated by the trigger set 15 are routed to the bridge circuit 6 or 7 as required in each case depending upon the direction of the output variable from the speed controller 13 (torque direction). A switchover occurs, respectively, after the flow of current in the bridge circuit which is, in fact, active, has been completed.

Because the current controller 14 only determines the value of the current, the polarity reverser 17 ensures that the polarity of a current setpoint or nominal value for the output from the speed controller 13 is also reversed when the ignition pulses are reversed. Operation of a DC motor with two three-phase bridges as described hereinbefore is quite well known.

If the bridge circuit 6 should fail as a result of a short-circuit or due to the interruption of semiconductors, namely the thyristors 5, the bridge circuit 6 will be isolated from the circuit, and the bridge circuit 7 will be connected in the same manner as the bridge circuit 6 is normally connected. The bridge circuit 7 can then be used for feeding the motor 1 for forward running. A switch 21 which transmits a switchover signal to the setpoint generator 10, the signal acting on the setpoint generator in such a way that reverse running of the motor 1 can no longer be initiated by the setpoint generator 10, is provided for switchover of the control circuit. The switchover signal from the switch 21 is also routed to an input of an actuation logic or actuation computer unit 22 for an electromagnetic brake 23. The output signal from the switch 21 is also routed to a further input of the current reversal logic or computer unit 18, and a third output from this current-reversal logic or computer unit 18 is connected to the other input of the actuation logic or actuation computer unit 22.

If the switch 21 is actuated, the current-reversal logic or computer unit 18 keeps the pulse switch 16 in such a position that it actuates the bridge circuit required for forwarding running of the motor 1. If an output signal characteristic for a speed of the motor 1 less by a prescribed amount than its actual speed is generated by the setpoint generator 10, the negative output voltage from the speed controller 13, which is routed to the current-reversal logic or computer unit 18 enables an output signal to be passed to the actuation logic or actuation computer unit 22, the latter signal then causing the motor 1 to be braked by a brake 23. The current-reversal logic or current reversal computer unit 18 simultaneously acts on the polarity reverser 17 in such a way that it passes to the current controller 14 a signal such that this current controller 14 enables the semiconductors in the bridge circuit supplying the motor 1 no longer to be conductively controlled, with the result that no further electrical power is withdrawn from the three-phase supply system.

The electromechanical brake is either in disengaged (released) condition or in engaged condition, depending upon the magnitude of the output signal from the actuation logic or actuation computer unit 22, the output signal assuming two values.

Figure 2:
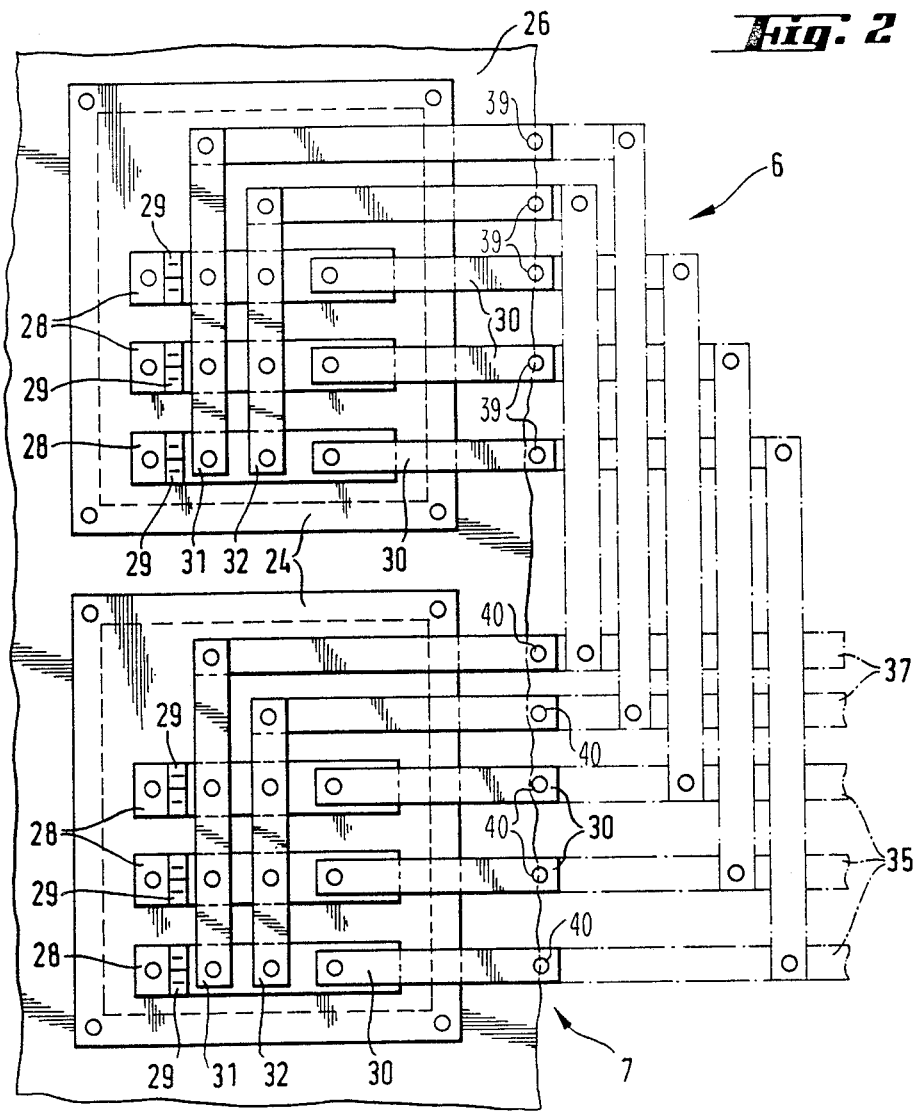
FIG. 2 is a diagrammatic view of a connection of two bridge circuits forming part of the invention.

In FIG. 2, two heat sinks 24 are arranged at a distance from one another, and are mounted on a carrier 26 of a switch cabinet. Three thyristor modules 28 are mounted on each heat sink 24, each thyristor module 28 forming two rectifier sections having respective anodes and cathodes. Each thyristor module has two control connections 29, an AC connection 30, which is routed to the anode of one of the rectifier section and to the cathode of the other rectifier section, and two DC connections 31 and 32, at which the positive and/or negative DC voltage for the motor is available. The three thyristor modules 28 mounted on each heat sink 24 form a three-phase bridge circuit containing a total of six rectifier lengths. The two bridge circuits are connected to one another by current conductors or busbars mounted in screw terminal connections in the manner shown in FIG. 2: busbars 35 are routed to the AC power supply, and busbars 37 to the electric motor 1. Each of the two bridge circuits can be isolated completely from the busbars 35 and 37 by undoing the screw terminal devices 39 and 40 respectively. If it is assumed that the lower bridge circuit shown in FIG. 2 is the bridge circuit 7 of FIG. 1, and that this bridge circuit fails, then the bridge circuit 6 can quite simply replace the bridge circuit 7 after complete isolation of the busbars 35 and 37 from the bridge circuit 7 by simply interchanging the AC current connections to the bridge circuit 6.

The heat sinks 24 are mounted on a carries 26 by means of bolts and can be easily removed after the bolts have been loosened. The invention is applicable to the motor or motors for the main drive of a printing press or the like, and also for other motors on a printing press or the like, e.g. paper-pile lifting motors, which are used in sheet-fed printing presses for continuous or step-by-step raising or lowering of the pile of sheets of paper to be fed to the press.

The foregoing is a description corresponding in substance to German application No. P 35 41 275.5, dated Nov. 22, 1985, the International priority of which is being claimed for the instant application, and which is hereby made part of this application. Any material discrepancies between the foregoing specification and the aforementioned corresponding German application are to be resolved in favor of the latter.

We claim:

1. Control circuit for an electric motor having a first power control element having a plurality of semiconductors for driving the motor in one torque direction, and a second power control element having a plurality of semiconductors for driving the motor in the other torque direction, comprising means for separating at least one of the first and second power control elements, upon failure of the one of the first and second power control elements, and connecting the remainder of the circuit to the other of the first and second power control elements instead of the failed one of the first and second power control elements.

2. Control circuit according to claim 1, wherein both of the power control elements are of substantially like construction.

3. Control circuit according to claim 1, wherein each of the power control elements is constructed as a unit readily removable from the control circuit.

4. Control circuit according to claim 1, wherein the power control elements are controllable current converters.

5. Control circuit according to claim 1, wherein each of the power control elements contains an AC bridge circuit.

6. Control circuit according to claim 1, including means for reversing excitation of the motor.

7. Control circuit according to claim 1 wherein the motor has an armature, and a field winding, and including means for reversing current direction in said armature.

8. Control circuit for an electric motor having a first power control element having a plurality of semiconductors for driving the motor in one torque direction, and a second power control element having a plurality of semiconductors for driving the motor in the other torque direction, comprising means for at least isolating one of the first and second power control elements, upon failure of the one of the first and second power control elements, and connecting the remainder of the circuit to the other of the first and second power control elements instead of the failed one of the first and second power control elements, and switches for electrically isolating the failed one of the first and second power control elements and for switching over connections between the control circuit and the power control elements.

9. Control circuit for an electric motor having a first power control element having a plurality of semiconductors for driving the motor in one torque direction, and a second power control element having a plurality of semiconductors for driving the motor in the other torque direction, comprising means for at least isolating one of the first and second power control elements, upon failure of the one of the first and second power control elements, and connecting the remainder of the circuit to the other of the first and second power control elements instead of the failed one of the first and second power control elements, and auxiliary braking means for braking the motor upon said failure of the one of the first and second power control elements.

10. Control circuit according to claim 9 wherein said auxiliary braking means is a brake at least in part operating mechanically, and including control means switchable so as to generate a control signal for actuating said brake at least upon occurrence of a condition necessitating additional braking of the motor.

* * * * *